United States Patent
Lofts et al.

(10) Patent No.: US 9,132,430 B2
(45) Date of Patent: Sep. 15, 2015

(54) SYSTEM AND METHOD FOR PROCESSING MULTIPLE POLYMER COMPONENT ARTICLES FOR RECYCLING

(71) Applicants: Simon William Lofts, Portland, OR (US); Samuel Graham Stevens, Charlotte, NC (US); Nathiel Egosi, Dix Hills, NY (US)

(72) Inventors: Simon William Lofts, Portland, OR (US); Samuel Graham Stevens, Charlotte, NC (US); Nathiel Egosi, Dix Hills, NY (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 13/743,861

(22) Filed: Jan. 17, 2013

(65) Prior Publication Data
US 2014/0197253 A1     Jul. 17, 2014

(51) Int. Cl.
| | |
|---|---|
| *B02C 17/02* | (2006.01) |
| *B02C 19/00* | (2006.01) |
| *B02C 23/08* | (2006.01) |
| *B29B 17/02* | (2006.01) |
| *B29L 31/50* | (2006.01) |
| *B29B 17/04* | (2006.01) |

(52) U.S. Cl.
CPC ............. *B02C 23/08* (2013.01); *B29B 17/02* (2013.01); *B29B 2017/0203* (2013.01); *B29B 2017/0416* (2013.01); *B29L 2031/50* (2013.01)

(58) Field of Classification Search
USPC .................... 241/14, 19, 24.19, 24.29, 29, 23
See application file for complete search history.

(56) References Cited

U.S. PATENT DOCUMENTS

| | | | |
|---|---|---|---|
| 2,879,005 | A | 3/1959 | Jarvis |
| 3,666,185 | A | 5/1972 | Williams |
| 4,020,992 | A | 5/1977 | Binger et al. |
| 4,483,488 | A | 11/1984 | Luff et al. |
| 5,203,511 | A | 4/1993 | Ondush et al. |
| 7,325,757 | B2 | 2/2008 | Allen et al. |
| 7,325,758 | B2 | 2/2008 | Bastin et al. |
| 2004/0112994 | A1* | 6/2004 | Tucker et al. .................. 241/1 |
| 2006/0246343 | A1* | 11/2006 | Mitchell et al. ............... 429/44 |
| 2007/0045455 | A1* | 3/2007 | Tuzson et al. ............ 241/24.19 |
| 2011/0272507 | A1* | 11/2011 | Medoff ......................... 241/29 |
| 2011/0288188 | A1* | 11/2011 | Walters ......................... 521/40 |

* cited by examiner

*Primary Examiner* — Faye Francis
(74) *Attorney, Agent, or Firm* — Shook, Hardy & Bacon L.L.P.

(57) ABSTRACT

A system and method for separating polymer components of a multi-component article, such as a shoe, is presented. The described system and method exploits the differences in embrittlement and glass transition temperature of different polymer components of the multi-component article by cryogenically freezing the prepared article and impacting the article such that one polymer component is pulverized without substantially fracturing the remaining portion of the article. The system and method further includes a re-looping capability to maximize separation and recovery of polymer components.

5 Claims, 9 Drawing Sheets

SYSTEM AND METHOD FOR PROCESSING MULTIPLE POLYMER COMPONENT ARTICLES FOR RECYCLING

CROSS-REFERENCE TO RELATED APPLICATIONS

None

FIELD

The present disclosure relates to systems and methods for processing articles with multi-polymer components including footwear for recycling.

BACKGROUND

Millions of shoes and other apparel articles are discarded every year. These shoes and other apparel articles contain materials that, if successful recovered, may be re-used or re-purposed. The recovery of these materials is important to reducing post-consumer waste as well as maximizing the usefulness of the materials fabricated for the production of the apparel articles. Methods exist for separating polymeric materials from metallic, glass, and plastic materials; however, apparel articles typically comprise multiple polymer components that must be separated and classified in order to maximize recycling options for these components.

SUMMARY

Accordingly, a system and method for recycling an article containing multiple polymer components is presented herein, utilizing the differing temperature-dependent fracture properties of polymer constituents.

One object of the invention includes a method of separating polymer components of a multi-component article for recycling. The method comprises chopping an article having at least a first polymer component, a second polymer component, and a textile component into article pieces. Once chopped into article pieces, the pieces may be cooled below a first temperature. While still below the first temperature, the article pieces are impacted such that a portion of the first polymer component is shattered into first polymer component pieces; and separating the impacted article pieces into the first polymer component pieces and a concentrated second polymer fraction comprising the remaining portion of the first polymer component, the second polymer component, and the textile component. The method further comprises impacting the concentrated second polymer fraction while below the first temperature, such that a portion of the first polymer component is shattered into first polymer component pieces; and separating the impacted concentrated second polymer fraction into first polymer component pieces and a second polymer fraction comprising the second polymer component, the textile component, and a predetermined percentage of the first polymer component. The predetermined percentage of the first polymer component may be less than 10%. The method may be applied to an article wherein the first polymer is a rubber and the second polymer is a foam material. The method further comprises, classifying the first polymer pieces according to color. The method is also applicable to an article further comprising a metal component and the method comprises separating the metal component from the article pieces. The first temperature may be 80 K or less; alternately, the first temperature may be below the glass transition temperature of the first polymer component.

An additional object of the invention includes a method for separating polymer components of a multi-component article for recycling. The method comprises chopping an article comprising a first polymer component, a second polymer component, and a textile component into article pieces comprising at least the first polymer component and the second polymer component and the textile component; separating the article pieces into fabric pieces comprising the textile component and chips comprising the first polymer component and the second polymer component; and cooling the chips below a first temperature. The method further comprises, while below the first temperature, pulverizing the chips, such that a portion of the first polymer component is shattered into first polymer component pieces, wherein the first polymer component pieces may be smaller than the chips; and separating the pulverized chips into the first polymer pieces and a concentrated second polymer fraction pieces comprising the second polymer component and the remaining portion of the first polymer component. The method further comprises pulverizing the concentrated second polymer fraction while below the first temperature, such that the remaining portion of the first polymer component is shattered into first polymer component pieces, wherein the shattered first polymer component pieces may be smaller than the concentrated second polymer fraction pieces; and separating the pulverized concentrated second polymer fraction into first polymer pieces and a final second polymer fraction comprising the second polymer component and a predetermined percentage of the first polymer component. The method may be applied to an article comprising a metal fraction, the method further comprising separating the metal fraction from the article pieces. The method may be applied to an article wherein the first polymer component is a rubber, the second polymer component is a foam material, and the textile component is a polyester. Furthermore, the first temperature may be 80 K or less.

Another object of the invention comprises a system for separating polymer components of a multi-component article for recycling. The system comprises a shredding device, a cryogenic chamber, a cryogenic impact mill, a trommel screen, an air knife and a conveyor. The shredding device chops an article comprising a first polymer component, a second polymer component, and a textile component into pieces, the pieces comprising the first polymer component, the second polymer component and the textile component. The cryogenic chamber cools the article pieces below a first temperature and a cryogenic impact mill maintains the cooled article pieces below the first temperature and pulverizes the article pieces such that a portion of the first polymer component is fractured from the remaining article pieces comprising the remaining portion of the first polymer component, the second polymer component, and the textile component. The heavy material fraction comprising the fractured first polymer component is separated from the remaining article pieces at the trommel screen. An air knife is used to separate the remaining article pieces into a light material fraction comprising a portion of the textile component and a concentrated polymer fraction comprising the remaining first polymer component and the remaining polymer component. The conveyor returns the concentrated polymer fraction to the cryogenic impact mill. The system may further comprise a first optical sorter to divide the heavy material fraction according to color. The system also comprises a second optical sorter to divide the light material fraction according to color. The system may comprise a metal separator. Additionally, the system may be used to process an article wherein the first polymer component is a rubber, the second polymer component is a foam material, the textile component is a polyester and the first temperature is below the glass transition temperature of the rubber.

One object of the invention includes a method for separating polymer components of a shoe for recycling, the method comprising chopping a shoe comprising a first polymer component and a second polymer component and a textile component into shoe pieces comprising at least a first polymer component and a second polymer component and a textile component; separating the shoe pieces into fabric pieces comprising the textile component and chips comprising the first polymer component and the second polymer component; cooling the chips below a first temperature. The method further comprises pulverizing the chips, while below the first temperature, such that a portion of the first polymer component is shattered into first polymer component pieces, wherein the first polymer component pieces may be smaller than the chips and separating the pulverized chips into the first polymer pieces and a concentrated second polymer fraction comprising the second polymer component and the remaining portion of the first polymer component.

In another object of the invention, the method further comprises, pulverizing the concentrated second polymer fraction, while below the first temperature, such that the remaining portion of the first polymer component is shattered into first polymer component pieces, wherein the shattered first polymer component pieces may be smaller than the concentrated second polymer fraction pieces; and separating the pulverized concentrated second polymer fraction into first polymer pieces and a final second polymer fraction comprising the second polymer component and a predetermined percentage of the first polymer component. The shoe may comprise a metal fraction and the method may comprise separating the metal fraction from the shoe pieces. The first polymer component may be rubber, the second polymer component may be foam, and the textile component may be polyester. The first temperature may be 80 K or less. Alternatively, the first temperature may be a temperature below the glass transition temperature of the first polymer component.

This section provides a general summary of the disclosure, and is not a comprehensive disclosure of its full scope or all of its features. Further areas of applicability may become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

The methods and systems described herein may be employed for recovering and recycling numerous articles containing more than one polymer component. Typically, recycling of multi-polymer articles is problematic as polymers often have similar relative densities and may be fused to other components of the articles. The exemplary described systems and methods exploit the differing temperature-dependent embrittlement properties of different polymers. For example, rubber and thermoplastic polyurethane (TPU) may be typical components of apparel and shoe articles that exhibit different properties at low temperatures. When cryogenically treated, rubber becomes brittle and may shatter upon impact. However, TPU maintains some degree of toughness and flexibility such that, at temperatures where rubber shatters, TPU does not.

Numerous methods exist for determining what temperature article should be cooled to in order to provide adequate pulverization of the first polymer component without substantially fracturing the second polymer component. Generally, the articles may be cooled to below 80 K using liquid nitrogen. Alternatively, the glass transition temperature of the first polymer component may be used to determine the temperature for processing the article. In another embodiment, testing standards such as ASTM D746-07 "Standard Test method for Brittleness Temperature of Plastics and Elastomers by Impact" or ASTM D 2137-05 "Standard Test Methods for Rubber Property-Brittleness Point of Flexible Polymers and Coated Fabrics" may be employed to determine the first temperature for cooling the article pieces or chips such that the first polymer component is brittle while maintaining the flexibility of the second polymer.

Figure 1:
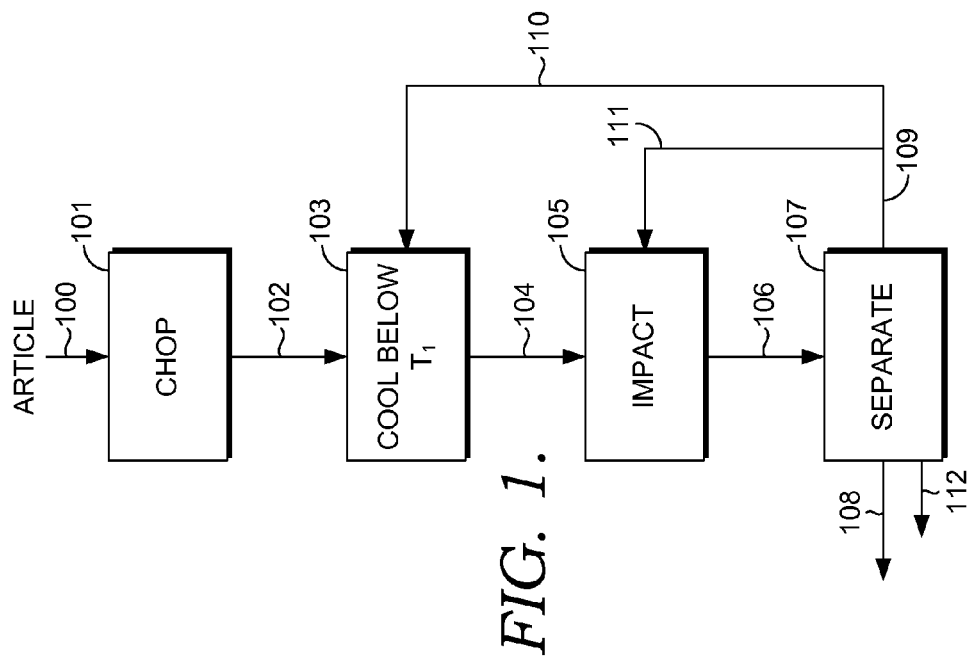
FIG. 1 is a flowchart of an exemplary method for separating polymer components from a multi-polymer article for recycling.

For example, FIG. 1 depicts one embodiment of a method for separating polymer components of a multi-component article for recycling. The article comprises at least a first polymer component, a second polymer component, and a textile component. The article 100 is chopped 101 into article pieces, which contain the first polymer component, second polymer component, and may contain the textile component. Chopping the article into pieces may reduce the residence time to cool the first polymer component below its embrittlement temperature. Next, the article pieces may be conveyed 102 to a cryogenic chamber to cool 103 the article pieces to a first temperature. For example, the first temperature may be 80 K. Alternatively, the first temperature may be below the glass transition temperature of the first component. As described above, the first temperature may be selected so that the first polymer component can be shattered without substantially breaking the second polymer component. The cooled article pieces may remain cooled while being impacted 105 such that the first polymer component is shattered. The impacted article pieces may be separated 107 into first polymer component pieces 108 and a concentrated second polymer fraction 112. The concentrated second polymer fraction may include some of the first polymer component which was not sufficiently shattered and separated. The concentrated second polymer fraction can be re-impacted 111 or re-cooled 110 and subsequently impacted 105 and separated 107. In this manner, the maximum recovery and segregation of the first polymer component and the second polymer component may be attained.

Additionally, a desired percentage of the first polymer component may be recovered, leaving a predetermined percentage of the first polymer with the second polymer component. For example, this predetermined percentage of the first polymer may be less than 10%. By way of further example, the recovered first polymer component may be sorted according to color such as by using an optical sorter. The article may also comprise a metal component that can be separated using metal segregating means.

Figure 2:
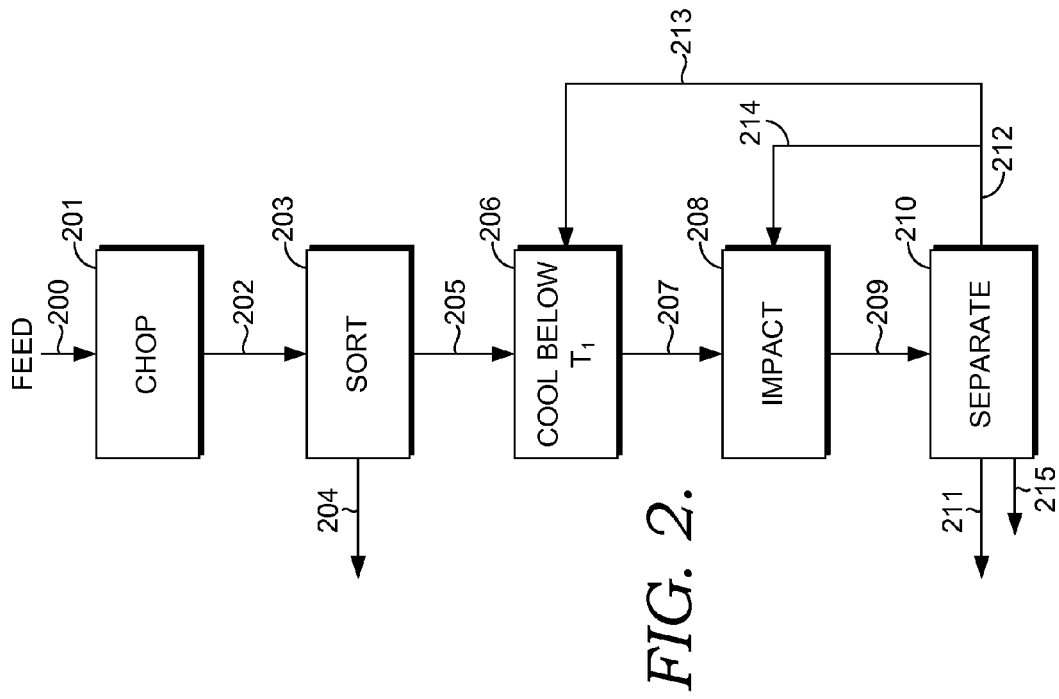
FIG. 2 is a flowchart of an exemplary method for separating polymer components and a textile component from a multi-polymer article for recycling.

An additional embodiment is shown in FIG. 2, articles 200 comprising a first polymer component, a second polymer component, and a textile component may be chopped 201 into article pieces. The article pieces 202 may be then sorted 203 such that article pieces may be separated into fabric pieces comprising primarily the textile component 204 and chips 205 comprising the first polymer component and second polymer component. As shown in FIG. 2, the textile component 204 may be separated from the chips 205, for example, by a vibratory screen and air knife. The chips 205 may be cooled below a first temperature $T_1$ 206. The first temperature $T_1$ may be determined by the glass transition temperature of the first polymer component. For example, the first temperature $T_1$ may be below 80 K and attained by using a liquid nitrogen coolant. Upon cooling below the first temperature, the first polymer becomes brittle and may be easily shattered into small pieces, while the second polymer component and any remaining textile component that may not have been removed at the sorting step 203 remain tough and may not substantially shatter. The cooled chips 207 may be pulverized 208 while still below $T_1$. Since only the first polymer component is brittle enough to shatter, the first polymer component may be pulverized without significantly breaking the second polymer component. The pulverized chips 209 may be separated 210 below $T_1$ into the pulverized first polymer component pieces 211 and concentrated second polymer fraction pieces 215, which contain the second polymer component and may contain some first polymer component that was not pulverized enough to separate from the second polymer component. In order to address the goal of maximum component segregation and recovery, the concentrated second polymer fraction may be re-cooled 213 and may proceed with the above described impacting 208 and separation 210. Alternatively, the concentrated second polymer fraction may not need re-cooling and proceed directly to impacting 214 and separation 210 of the first polymer component from an even more concentrated second polymer fraction. The chips may recirculated in the cooling 206, impacting 208, and separating 210 loop for as many steps as desired to achieve the target recovery percentage of the first polymer component.

This recirculation provides many advantages for maximum recyclability: by allowing for multiple cooling and impacting cycles, an exemplary 2" chip which may not be completely cooled through its volume at the cooling step 206, in the first impact 208 pass may only shatter the first polymer component that has achieved cooling below the first temperature. After separation of some of the volume of the 2" chip at the separation step 210, the next cooling pass may be able to cool more of the smaller concentrated second polymer fraction chip. The recirculation may allow for reduced residence time at the cooling step and multiple cooling and impacting cycles provide maximum segregation of the polymer components.

Figure 3:
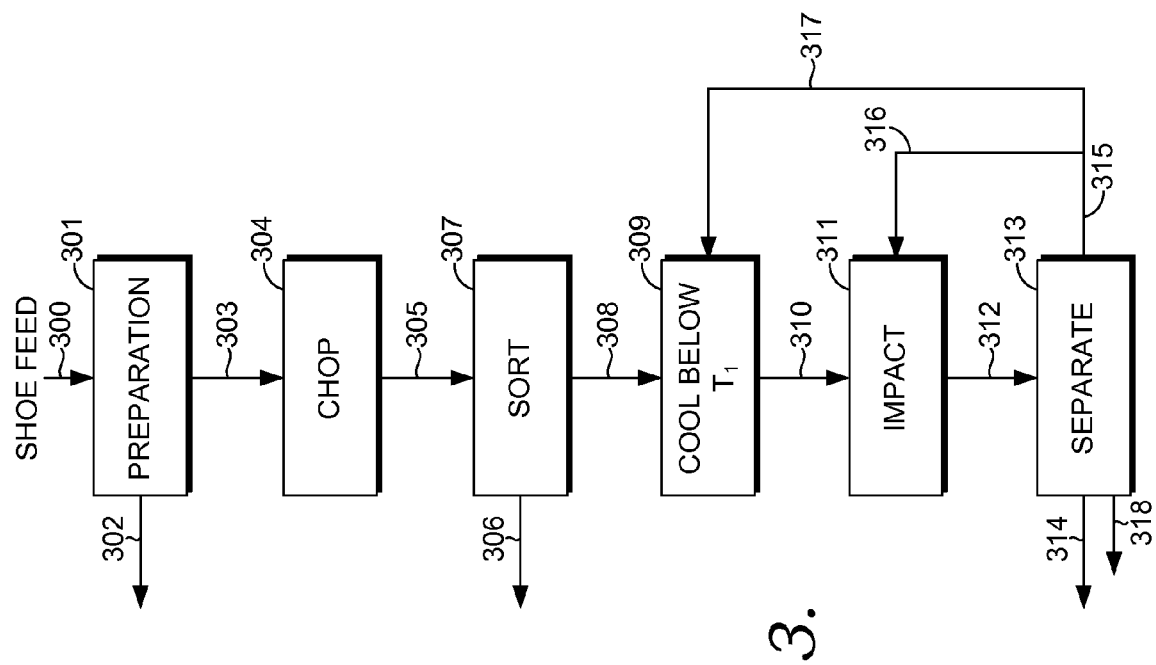
FIG. 3 is a flowchart of an exemplary method for separating polymer components and a textile component from a shoe for recycling.

FIG. 3 describes a method for separating polymer components of a shoe for recycling. In the previous FIG. 1 and FIG. 2, a first polymer component of a multi-component article was separated from a second polymer component. In FIG. 3, the multi-component article may be a shoe. In particular, athletic shoes may comprise a number of polymer components, as well as textile and metal components. The textiles used in constructing the shoes may also be polymer components; however, the first polymer component may be a rubber, such as for a shoe sole, and the second polymer component may be a foam material, such as for the midsole portion of the shoe. However, the second polymer component may be any other plastic useful in shoe construction instead of or in addition to a foam. In many shoes, the rubber and foam may be glued or otherwise bound together, making separation and recycling of these materials problematic. Moreover, once separated, the rubber and foam may be classified by color into light and dark portions to further facilitate recycling. Often the rubber and foam may be ground prior to recycling and, as such, the previously described impacting and pulverization of the first polymer component provides a first break-down of the first polymer component.

Referring to FIG. 3, the shoes 300, which may be athletic shoes, may be prepared 301 for recycling by several means such as sorting into shoe types and/or cleaning and removal of debris. Next the prepared shoes 303 comprising a first polymer component, such as rubber and a second polymer component, such as a polyurethane foam or TPU and a textile component may be chopped 304 into pieces. The size of the chopped pieces may be determined by the classification methods used downstream: for example, the chopped pieces may be 2" or less in width. The shoe pieces 305 may be sorted 307 so that pieces that are mostly fabric may be removed 306 from the feed and the remaining chips 308 comprising the first polymer component and the second polymer component. The chips 308 may be cooled below a first temperature $T_1$ which may be determined by the glass transition temperature of the first polymer. Generally, a first temperature may be selected such that the first polymer component becomes brittle while the second polymer component remains substantially flexible and tough. For example, liquid nitrogen may be used to cool the chips to a first temperature of lower than 80 K, although any cooling technique may be used. The cooled chips 310 may be impacted in order to pulverize the chips. Upon pulverization, the embrittled first polymer component is shattered into first polymer component pieces that may be smaller than the original chips. The pulverized chips 312 may be separated into first polymer component pieces 314 and concentrated second polymer fraction pieces 318. A single cycle of cooling 309, impacting 311, and separating 313 may be sufficient to achieve the desired degree of segregation of the first polymer component and the second polymer component, although the concentrated second polymer fraction pieces 315 may be re-cooled 317 and impacted 311 to remove more of the first polymer component pieces 314. In some instances, the concentrated second polymer fraction pieces 315 may not require re-cooling and go directly 316 to impacting 311 to remove more of the first polymer.

As described previously, recycling articles such as shoes often introduces non-polymeric components into the feed stream. Textiles of the components may be separated from the polymeric components using air classification. Shoes may also include metal components that can be separated using conventional metal separation means. The previously described recovery and separation methods may be supplemented by additional processing such as optical sorting, grinding, and baling.

Figure 4:
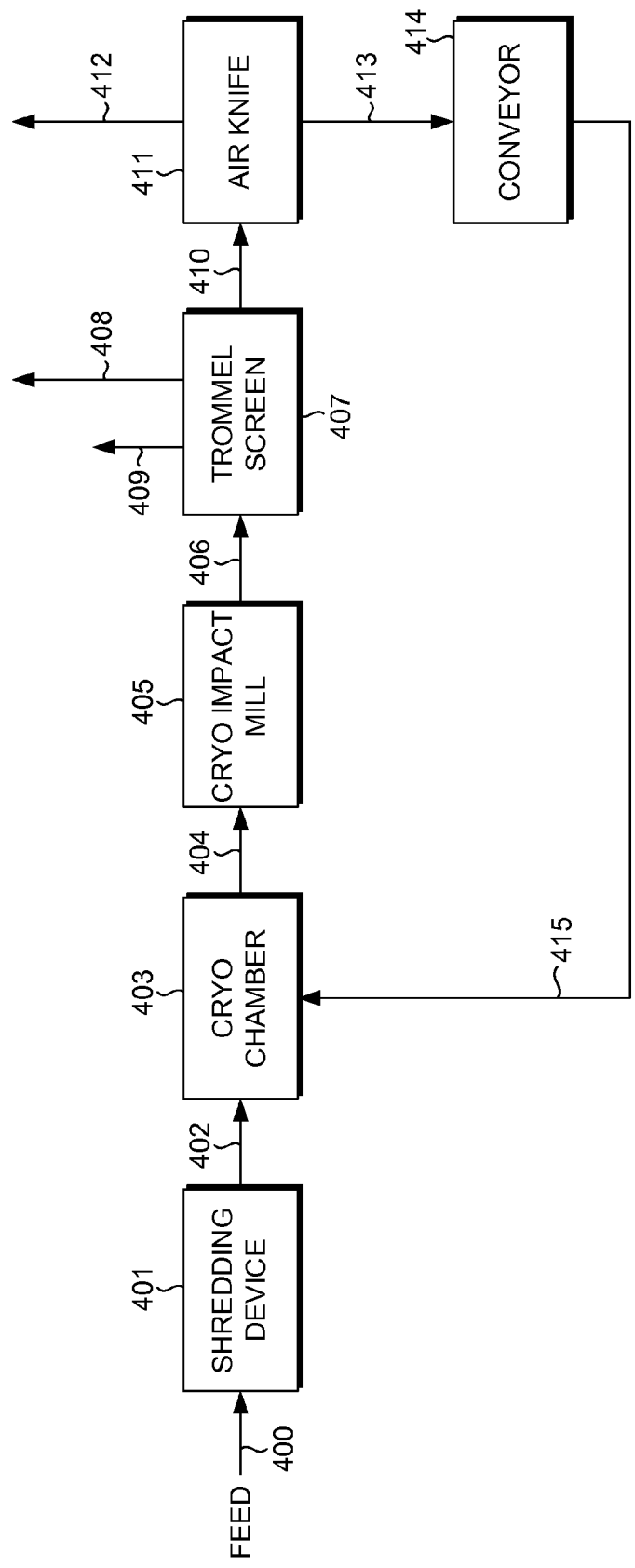
FIG. 4 is a schematic of an exemplary system for separating polymer components from a multipolymer article for recycling.

In FIG. 4, an exemplary system is illustrated for separating polymer components of a multi-component article for recycling. The feed 400, including articles comprising a first polymer component, a second polymer component, and a textile component, is passed to a shredding device 401. The shredding device 401 chops the article into pieces, which include the first polymer component, the second polymer component and the textile component. The pieces may be fed 402 to the cryo chamber 403. The cryo chamber 403 cools the article pieces below a first temperature. The first temperature may be determined using any of the previously described methods and may be a temperature at which the first polymer component embrittles while the second polymer component remains relatively tough. For example, the first polymer may be a rubber and the second polymer may be a foam material, plastic, fabric, or other composition useful for shoe construction. The cooled pieces 404 may be pulverized at a cryo impact mill 405 or equivalent apparatus for impacting the cooled pieces while maintaining a temperature of about the first temperature. The pulverization may result in a portion of the embrittled first polymer fracturing into smaller pieces than the unpulverized portion, which may be a concentrated second polymer fraction. The pulverized article pieces 406 may be then separated at a trommel screen 407 or other physical separation means. The trommel screen 407 may physically separate large pieces 410, which may be the remaining portion of the first polymer component, second polymer component, and textile component that were unpulverized at the cryo impact mill 405, from small pulverized first polymer component pieces 408. In addition, the trommel screen 407 may provide a metal component stream 409 which may be mixed with the first polymer component pieces 408. The metal component stream 409 and first polymer component pieces 408 may be sent to a metal separator to remove the metal component. The large pieces 410 may be sent to an air knife 411 or equivalent apparatus: the air knife may be used to separate the textile component 412 from a concentrated polymer fraction 413 comprising a remaining portion of the first polymer component and the second polymer component. In order to maximize recovery and separation of the first polymer component and the second polymer component, the concentrated polymer fraction 413 is sent to a conveyor 414 which returns 415 the concentrated polymer fraction to the cryo chamber 403 for re-looping. Alternatively, when the concentrated polymer fraction is still cooled below the first temperature and does not need re-cooling at the cryo chamber 403, the conveyor 414 may return the concentrated polymer fraction to the cryo impact mill 405.

The foregoing description of the embodiments has been provided for purposes of illustration and description. It is not intended to be exhaustive or to limit the invention. Individual elements or features of a particular embodiment may be generally not limited to that particular embodiment, but, where applicable, may be interchangeable and may be used in a selected embodiment, even if not specifically shown or described.

EXEMPLARY PROCESS DESCRIPTION

Figure 5:
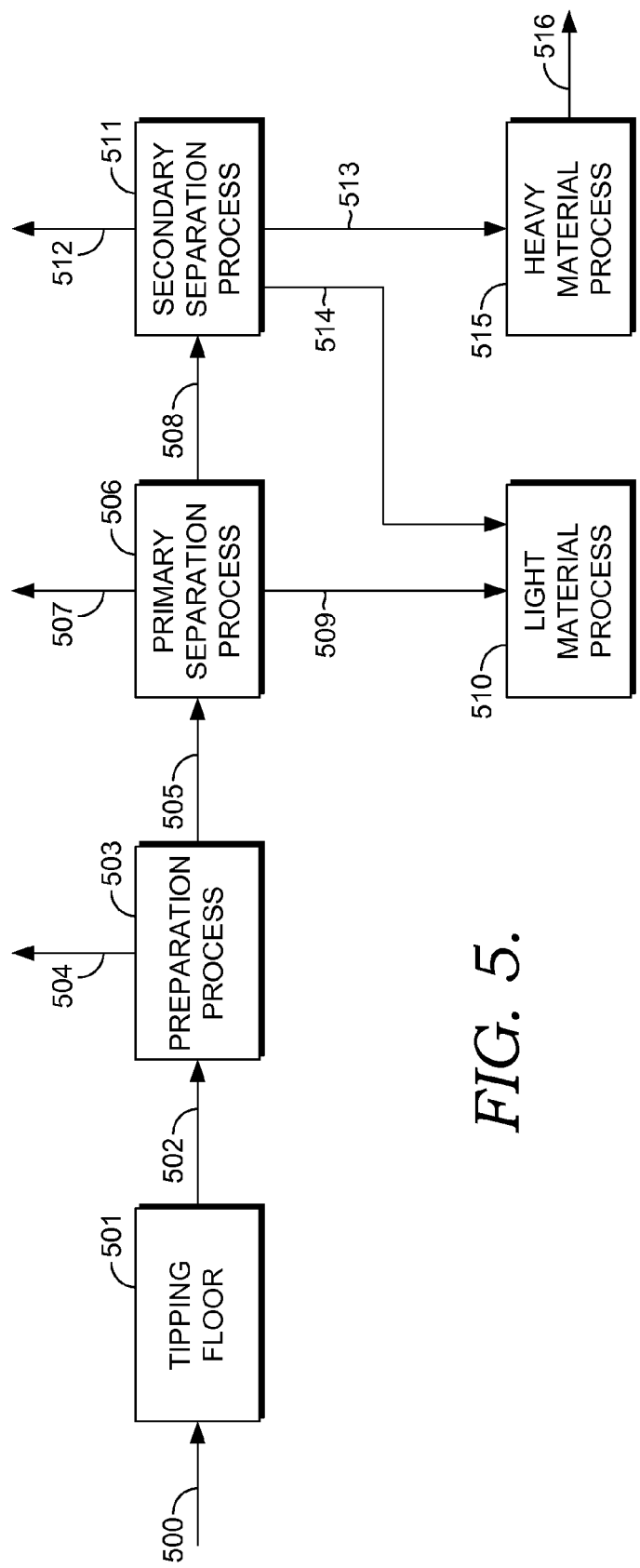
FIG. 5 is a schematic of an exemplary process for recycling shoe components.

The exemplary process described herein is merely one proposed system and method and is not limiting with regards to the present invention. The exemplary process may provide the capability to process annually a total of 25 million pairs of athletic shoes, from several different sources, into recyclable materials. The guiding logic in establishing the various exemplary processing steps has been to assure that the in-feed stream is as "clean" as possible, reduce the shoes to the most desirable size for liberation of the components, perform the liberation steps to separate the components and then refine the separated materials. Generally, as shown in FIG. 5, incoming shoes 500 may be processed first at a tipping floor 501 and fed 502 the preparation process 503. At the preparation process 503, contaminants 504 may be separated from the shoes, which may be fed 505 to the primary separation process 506. During the primary separation process, a heavy materials stream 508, a light material stream 509 and a waste stream 507 may be generated. The light material stream 509 is supplied to the light material process 510. The heavy material stream 508 is subjected to the secondary separation process 511. During the secondary separation process 511, a heavy material stream 513, a light material stream 514, and a waste stream 512 may be generated. In turn, the heavy material stream 513 may undergo the heavy material process 515 and the light material stream 514 may undergo the light material process 510. Each of these processing steps will be discussed individually below.

Tipping Floor (FIG. 5): In FIG. 5, incoming athletic shoes may be expected from various sources 500, each of which may be processed separately to avoid cross contamination. As deliveries may not coincide with planned processing schedules, separate storage bunkers may be provided for each type and an additional bunker may be provided for storage of other materials that may be processed. To allow for extended processing runs for each type of shoe, the bunkers may be sized to hold at least 80,000 pounds of materials such that, at the system design throughput capacity of 10,000 lbs/hour, a full shift run can be made. There may be some equipment clean-out to avoid cross-contamination during processing and to minimize cleaning times. The incoming shoes 500 may be received loose, in bales or in gaylords. Sufficient mobile equipment operating area may be provided to allow for the breaking of bales, dumping or gaylords and stacking of loose materials, and for their retrieval to the infeed hoppers of the processing lines. This area may also provide the initial inspection of incoming materials for removal of unwanted, large contaminants and trash. Loose material may be handled by front-end loaders and bales and gaylords may be handled by fork-lift trucks.

Figure 6:
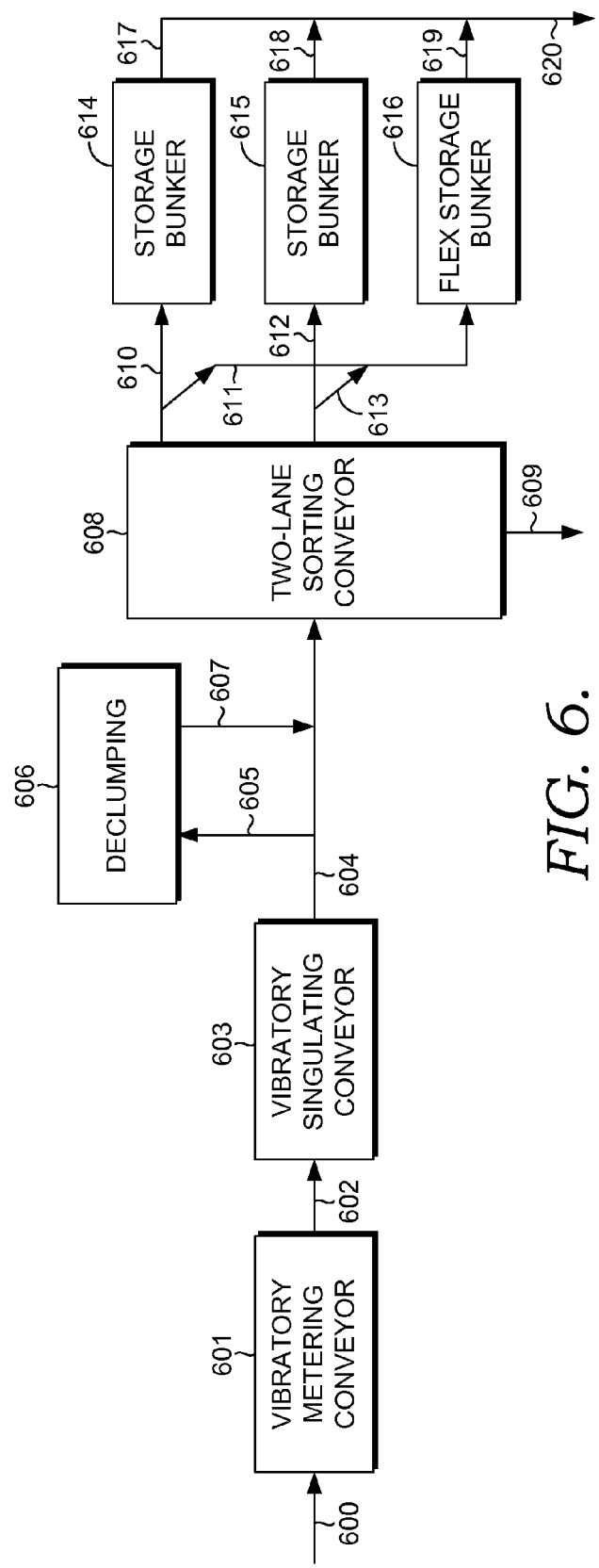
FIG. 6 is a schematic of an exemplary preparation process for recycling shoe components.

Preparation Process (FIG. 6): In FIG. 6, shoes may be selected from storage bunkers and delivered 600 by front-end loader to one of two infeed hoppers. As shown in FIG. 6, two lines may be provided, each capable of processing 5000 lbs/hour. The hopper may discharge onto the first 601 of two vibratory pan feeders which may begin a singulating process so that personnel may be able to sort out any contaminating materials from the feed stream. The vibratory metering conveyor 601 may regulate the infeed rate and reduce burden depth 602 to the second unit 603. The second unit or vibratory singulating conveyor 603 may reduce the flow to a single-shoe depth and operates at a higher flow rate than the first unit 601. At the end of the second unit 603, a table conveyor 604 may be provided to allow for the manual removal 606 of clumped or intertwined shoes so they may be separated for better visual inspection. Different types of shoes may be present in any given incoming stream 600 so that it may be desirable to separate out unwanted materials. Inspection and removal of these materials may be done on a two lane conveyor 608 along which may be provided chutes for the removal of trash 609. The amount of trash materials 609 to be removed has been estimated to average 5% of the incoming feed and may include such materials as dirt, stones, cardboard, tissue paper, plastic bags and non-recyclable shoes. It is recognized that the definition of non-recyclable shoes may change over time. Also, adequate sorting stations are provided to accommodate short during surges of trash items to as much as 20% of the incoming stream as these material may likely not be uniformly distributed. Sorted shoes from each lane may be delivered to dedicated, self-emptying storage bins 614, 615 of 100 cubic yard capacity each. A third bin 616 and shuttle transfer conveyor has been provided to allow for storage of any materials in excess of what the two dedicated bins 614 and 615 may hold. The storage bins are linearly located so that a single transfer conveyor 620 may be used to deliver material to the Primary Preparation Process.

Figure 7:
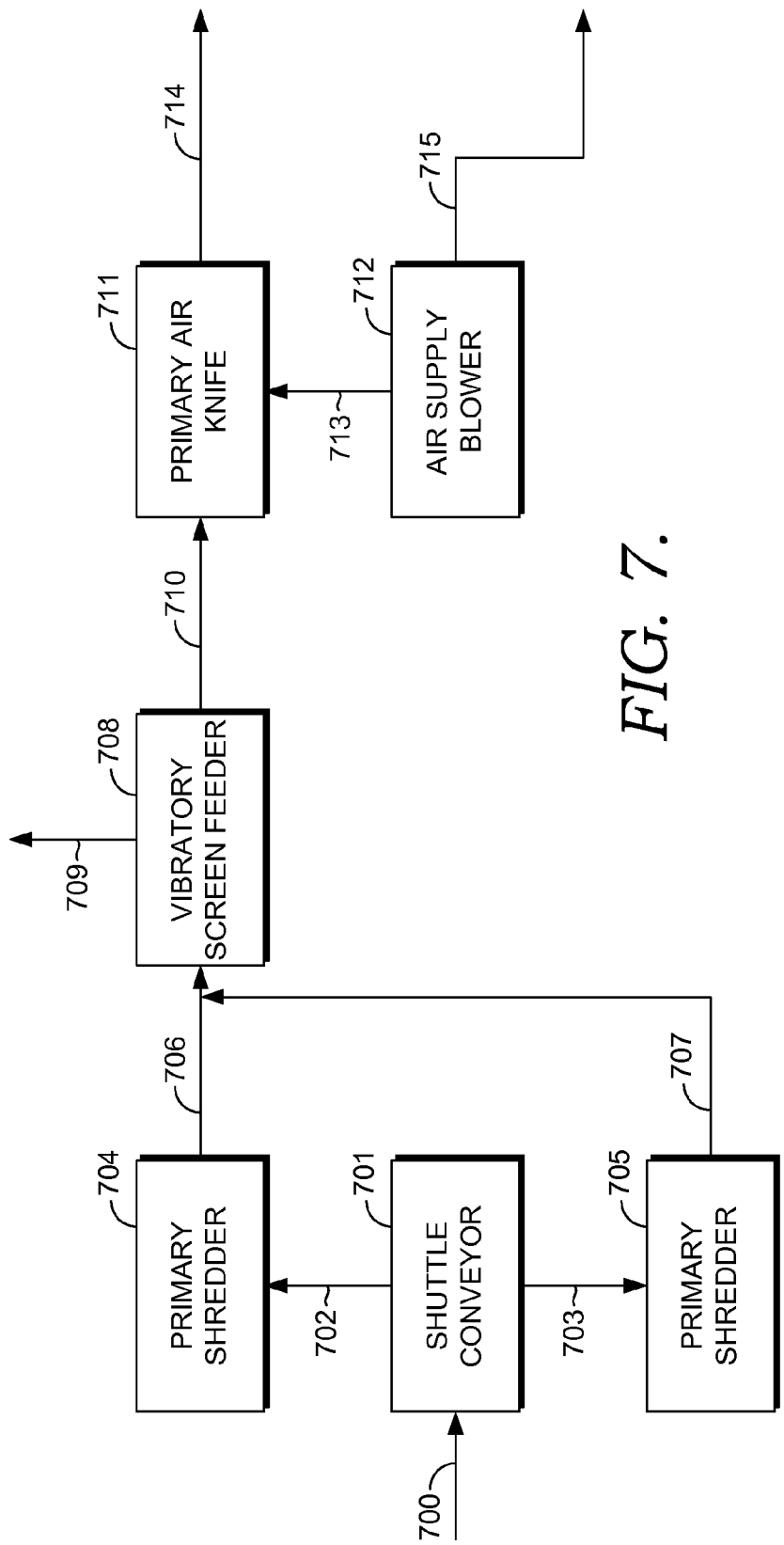
FIG. 7 is a schematic of an exemplary primary separation process for recycling shoe components.

Primary Separation Process (FIG. 7): In FIG. 7, the transfer conveyor 700 may elevate material to a shuttle conveyor 701 which may deliver material 702, 703 to each of the two shredder hoppers. Control of the shuttle conveyor may be by level controls on each of the hoppers. The two shredders 704, 705 may be a single rotor type, force fed by an injection ram which controlled by monitoring the amperage draw of the drive motor. A variable frequency drive (VFD), controlling drive motor speed, may receive inputs from downstream instrumentation in the Secondary Separation Process to match the output from these shredders to the input of the cryogenic system. A screen in the bottom of the shredder controls the output sizing, which may be a nominal 2 inch chip. The shredders may discharge onto a vibratory screen feeder 708 with a deck of small openings which may allow stones and dirt 709 to be shaken out of the 2 inch chips 710. A large portion of the chipped shoes may be the shoe tops which do not contain any rubber or dense foam. These shoe-top chips may be lower in density than the rubber-containing chips so that air classification 711 may be utilized for separation of the two fractions. The lighter fraction may be delivered to the Light Material Process 715 and the heavier fraction may proceed to the Secondary Preparation Process 714. This initial air separation step may considerably reduce the quantity of material to be frozen for further separation, thereby reducing the quantity of liquid nitrogen used. At this point, the two separate processing lines may be combined into a single stream since the amount of the heavy fraction can be suitably processed through a single cryogenic system. This fraction may be delivered to an intermediate surge bin which serves as the supply point for the Secondary Separation Process 714.

Figure 8:
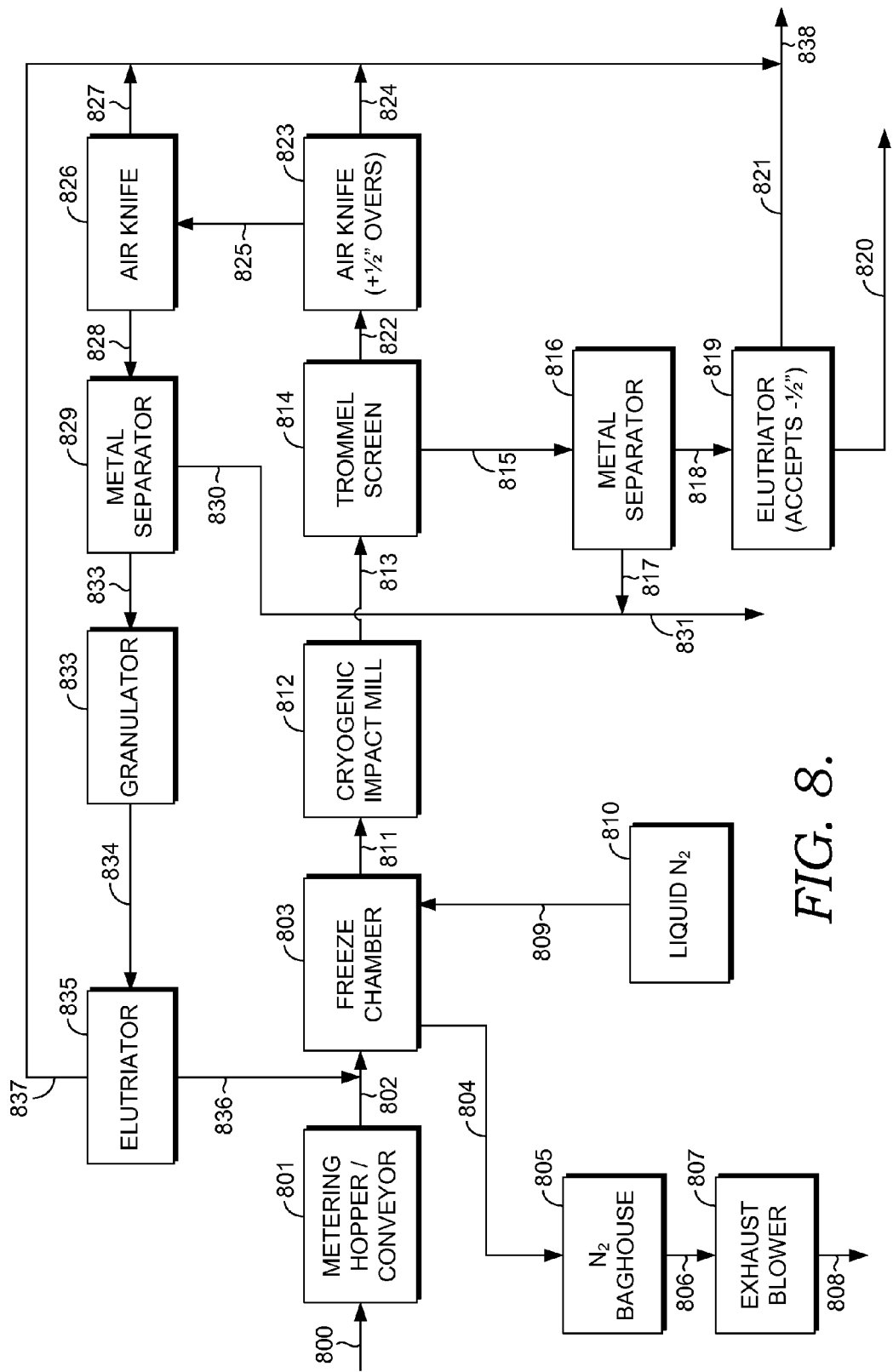
FIG. 8 is a schematic of an exemplary secondary separation process for recycling shoe components.

Secondary Separation Process (FIG. 8): In FIG. 8, the Secondary Separation Process involves the cryogenic impact milling of the 2 inch chips 800 to liberate rubber from the other components of the shoes, primarily plastics, fabric and paper. The treatment of rubber in a bath of liquid nitrogen changes the rubber from a pliable state to a rigid glass-like state, thereby making it susceptible to fracturing, much like glass. The surrounding shoe materials tend to stay in flexible condition so that, upon impact, they flex. This difference allows the rubber to be shattered or broken away from the other materials in smaller pieces which can then be classified away from the other materials.

The supply bin may be equipped with a cleated belt conveyor 801 which meters chips into the rotary freeze chamber where liquid nitrogen is introduced to achieve the desired glass-like state in the rubber. Other coolants may be used in place of liquid nitrogen as well. This conveyor may be equipped with a belt scale to record the amount of material being fed to the cryogenic process and, in conjunction with level controls on the supply bin, may provide the feedback for control of the shredder motor speed. The chips may be introduced 802 into the freeze chamber 803 through a large rotary feeder and are moved through the chamber by a slight incline and internal lifting vanes. The liquid nitrogen 810 may be introduced 809 at the lower discharge end through a spray bar which provides a small pool of liquid right before discharge. Gaseous waste nitrogen 804 may be transferred to the nitrogen baghouse 805 and exhausted 808 via the exhaust blower 807. Residence time in the drum may be regulated by drum RPM and degree of incline. The flow of liquid nitrogen may be regulated by a modulating valve controlled by exit temperatures. From the freeze chamber, the frozen chips drop directly into 811 the cryogenic impact mill 812 for fracturing and liberation of the rubber components. Due to the cushioning effect of the more pliable materials, not all of the rubber may be liberated in a single pass so therefore a reloop 837 capability is provided. The exiting stream 813 from the mill may be passed through a trommel screen 814 with ½" holes to recover the desired rubber fraction. Belt scales may be included on the ½" fraction discharge conveyor and on the oversize discharge conveyor to determine the amount of material reporting to each. This feature may allow for development of an operating algorithm to monitor performance of the cryogenic system. This ½" fraction 815 may then be passed through a metal detector 816 to remove any tramp metals and then to an elutriator 819 to remove any fluffy foam ad fabric. The heavy materials from the elutriator go to the Heavy Material Process 820 and the light materials go to the Light Material Process 821.

The oversized material from the trommel screen 814 goes to 822 an air knife 823, 826 where lightweight fabric 824 and foam 827, no longer attached to rubber, may be separated from the material 828 to be relooped 837. This fraction may be reduced in size through a granulator 833 where more fabric and fluffy foam may be liberated from rubber an elutriator 835 removes the light material. The concentrated rubber fraction may be reintroduced 836 into the freeze chamber for more impact milling. From each of these separation steps, the light fraction may be collected for further processing in the Light Material Process 838.

Figure 9:
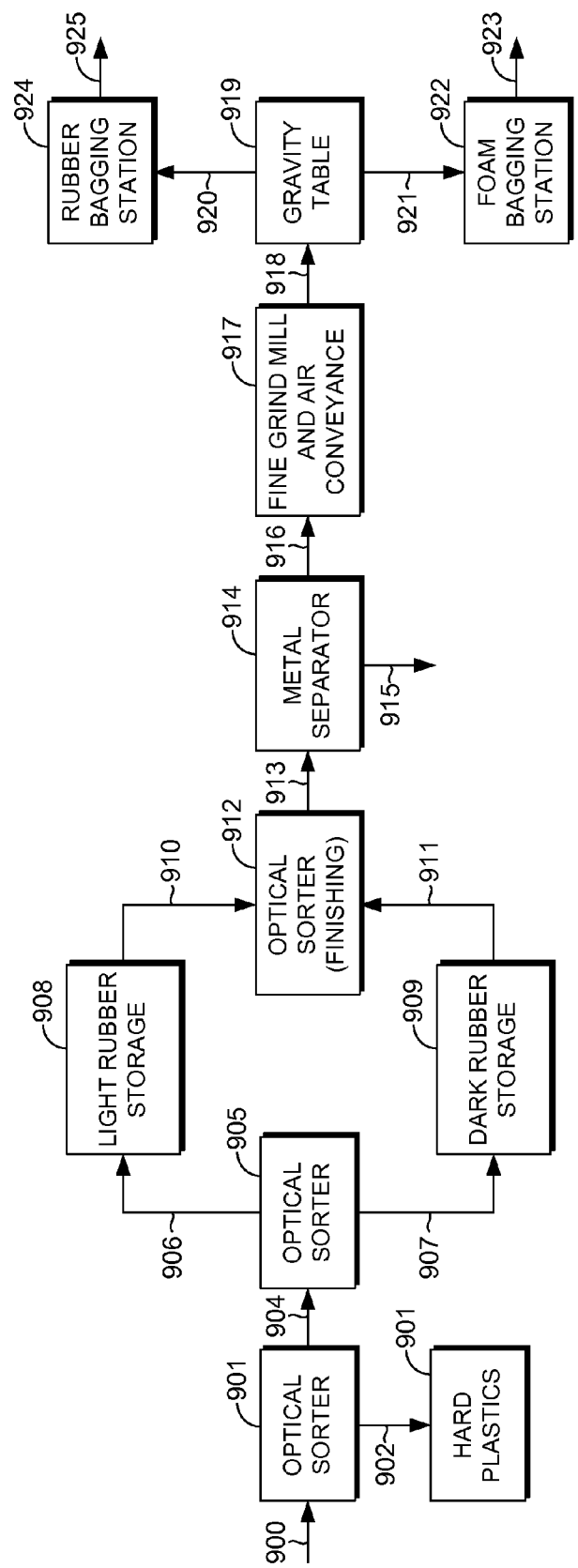
FIG. 9 is a schematic of an exemplary heavy material process for recycling shoe components.

Heavy Material Process (FIG. 9): In FIG. 9, the heavy fraction 900 from the Secondary Separation Process elutriator passes through an optical sorter 901 to remove hard plastics 901, such as TPU, and through an optical color sorter 905 to divide the stream into light color rubber 906 and dark color rubber 907 streams. Each of these streams may be delivered to dedicated storage bins 908, 909 for further refinement. The storage bins may be designed to hold 1000 cubic feet of each color so that extended runs of each may be made in the refining processing.

The liberated light and dark rubber fractions may be processed separately in refining process which may remove dense foam and other contaminants from the desired sole rubber products. The selected rubber fraction (light or dark) may be metered from its respective storage bin 908, 909 to a finishing color sorter 912 which may remove remaining cross-colored materials that may be present after the initial color sorting in the Secondary Separation Process. The material passes 913 through a metal separator 914 to detect and remove any remaining metallic material 915 to protect the mills. From the metal separator 914, material can be transferred to a fine grind mill or a coarse mill 917. The fine grind material may reduce the ½" material to a 10-20 mesh size product. The coarse mill may reduce the ½" material to a 1-3 millimeter (7-18 mesh) size product. The mills may liberate the dense foam from the sole rubber; a finer grind may improve separation yields. There may remain a small fraction of the material in which foam and rubber may still be combined. The ground material may then be delivered 918 to an air gravity table 919 where the sole rubber 924 may be separated from foam and rubber/foam 922. From the air gravity table, each stream 920, 921 may be conveyed to a supersack bagging station 924, 922. The bagging stations 924, 922 may be equipped with scales, which control the amount of filling.

Figure 10:
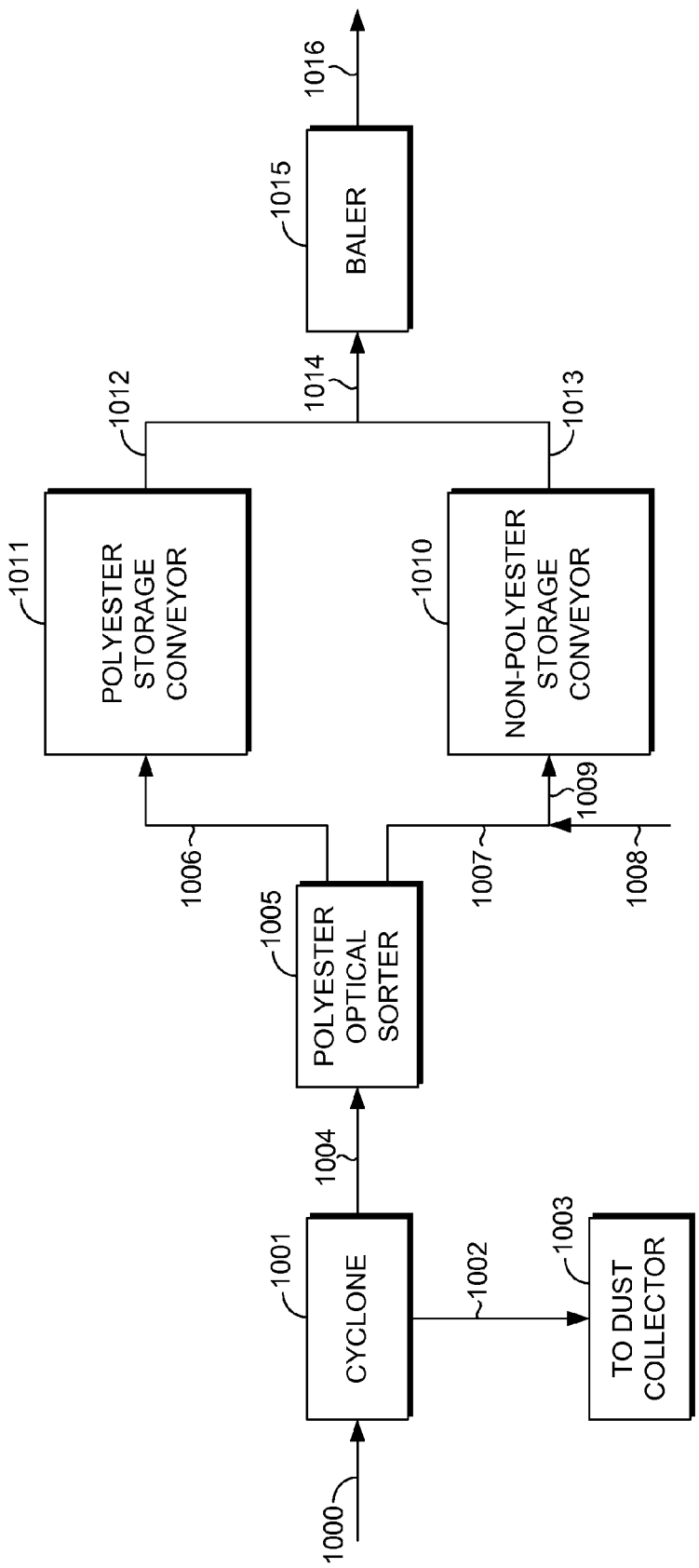
FIG. 10 is a schematic of an exemplary light material process for recycling shoe components.

Light Material Process (FIG. 10): This module is designed to process light materials 1000 liberated from the sole rubber and dense foam in both the Primary Separation Process and the Secondary Separation Process. These materials may be separated from the denser materials in the various air classification steps. The sizing of the light materials may include a nominal 2" size from the primary air knives, a somewhat smaller size from the reloop air knives after the cryogenic milling, and a minus ½" size from the two elutriators in the Secondary Separation Process. The shoe materials in this stream may be all of the materials used in the top section of shoes plus a small fraction of sole rubber and dense foam. The amounts of sole rubber and dense foam may not warrant further separation from the other materials just to recover them. However, further separation of the light materials in the subsequent processing may include a recovery step.

The fabric materials removed in the Primary Separation Process may pass through an optical sorter 1005 to separate polyester material 1011 from non-polyester material 1010. The polyester material 1011 may be delivered to a dedicated storage bin for subsequent baling 1015. The non-polyester material 1010 may be combined with other fabric materials removed in the Secondary Separation Process and the Heavy Material Process and may be delivered to a separate dedicated storage bin for subsequent baling 1015.

The exemplary process described above is an exemplary system and method for segregating polymer components of multiple polymer-component articles, specifically shoes, for recycling. The exemplary process employs a preparation process, a primary separation process, secondary separation process, a heavy material process, and a light material process, each process having intermediate components and steps. Many different arrangements of the various components depicted, as well as components not shown, are possible without departing from the scope of the claims below. Embodiments have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A method for separating polymer components of a multi-component article for recycling, said method comprising:
    chopping an article comprising a first polymer component and a second polymer component and a textile component into article pieces comprising at least
    a first polymer component and a second polymer component and a textile component;
    separating the article pieces into fabric pieces comprising the textile component and chips comprising the first polymer component and the second polymer component;
    cooling the chips below a first temperature;
    while below the first temperature, pulverizing the chips, such that a portion of the first polymer component is shattered into first polymer component pieces, wherein the first polymer component pieces are smaller than the chips;
    while below the first temperature, separating the pulverized chips into the first polymer pieces and a concentrated second polymer fraction comprising the second polymer component and the remaining portion of the first polymer component.

2. The method of claim 1, the method further comprising:
    while below the first temperature, pulverizing the concentrated second polymer fraction such that the remaining portion of the first polymer component is shattered into first polymer component pieces, wherein the shattered first polymer component pieces are smaller than the concentrated second polymer fraction pieces; and
    while below the first temperature, separating the pulverized concentrated second polymer fraction into first polymer pieces and a final second polymer fraction comprising the second polymer component and a predetermined percentage of the first polymer component.

3. The method of claim 1, wherein the article further comprises a metal fraction, the method further comprising:
    separating the metal fraction from the article pieces.

4. The method of claim 1, wherein the first polymer component is a rubber, the second polymer component is a foam material, and the textile component is a polyester.

5. The method of claim 1, wherein the first temperature is 80 K or less.

* * * * *